United States Patent Office 2,849,173
Patented Aug. 26, 1958

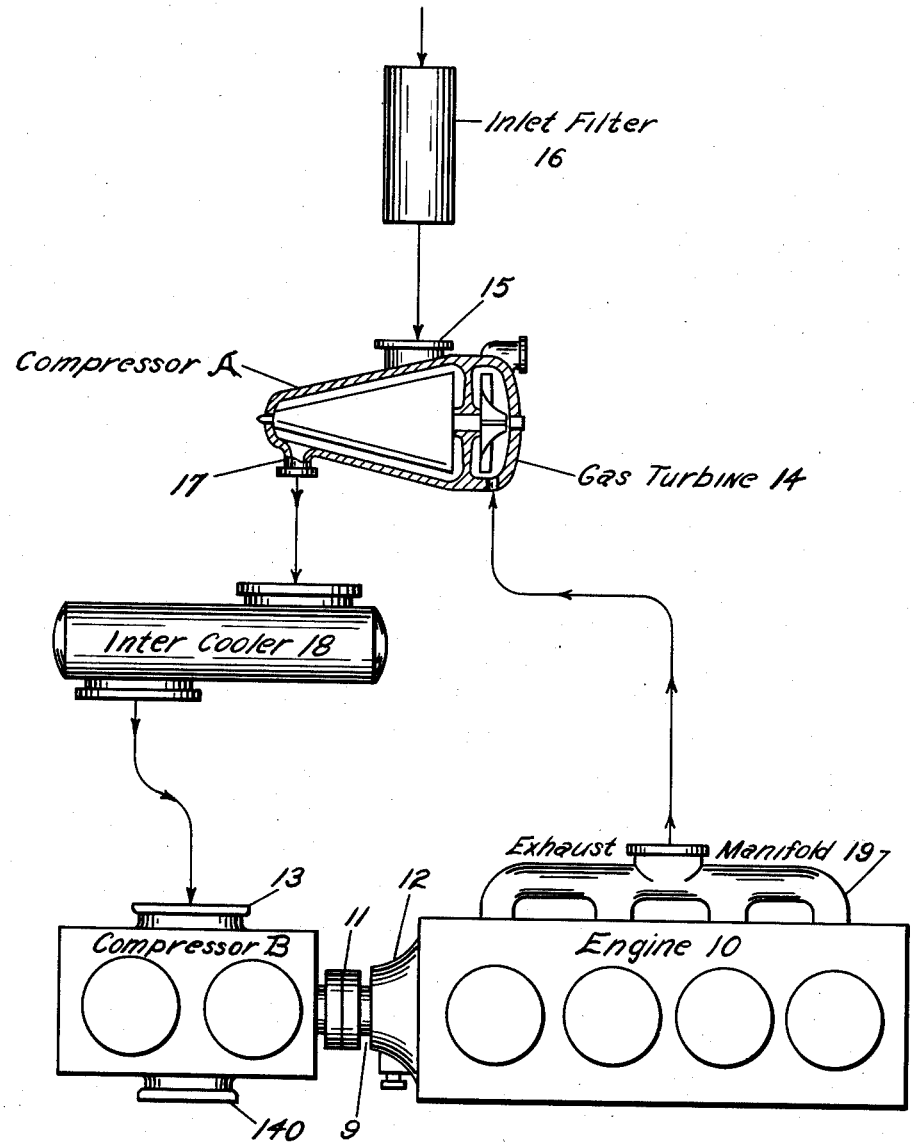

2,849,173

COMPRESSOR SYSTEM

Charles J. Surdy, Scarsdale, N. Y.

Application January 31, 1956, Serial No. 562,413

1 Claim. (Cl. 230—45)

This invention relates generally to compressors for air or other gases, but more specifically to compressor systems which include an internal combustion engine as the source of power for driving the compressor.

In producing compressors of the portable type it is extremely difficult to secure high capacity in terms of inlet volume due to the fact that piston type compressors have a practical limit as to size of cylinders, pistons and other reciprocating parts. For this reason, most portable compressors seldom exceed 600 C. F. M. capacity, and needs for greater capacity are usually met by coupling several compressors in parallel with attendant complications.

There is increasing need for high capacity, mobile compressor systems for mining and drilling work in capacities up to approximately 3600 C. F. M. at 100 p. s. i. g. discharge pressure; such discharge pressure of 100 p. s. i. g. usually being the minimum acceptable, with 200 p. s. i. g. discharge not uncommon.

It is the object of this invention, accordingly, to produce a high capacity compressor comprised of readily available industrial components such that utmost mobility and portability may be achieved.

The figure is a schematic view, mostly in plan, showing the elements comprising the essentials to this invention.

An internal combustion engine 10, preferably a diesel of the multi-cylinder type provides power for the piston type compressor B, through a flexible coupling 11 connected to engine 10 through a clutch in housing 12. The engine 10 has a rotating power take-off shaft 9 extending from clutch housing 12. If necessary, the compressor B may be driven through a gear train, belts or other transmission devices associated with shaft 9. While the compressor B is described as a piston type unit, it may be of the sliding rotary vane type. However, it is important that the compressor B be designed for the high discharge pressures required in portable units, 200 p. s. i. g. or more. The compressor B has an inlet 13 and a discharge 140.

Being a piston type unit, or of a type with relative low inlet capacity due to permissible speed of parts in friction, the compressor B in itself would not meet the requirements for high capacity. Accordingly, there is provided a compressor A of the high speed type driven by a gas turbine 14. The high speed compressor A preferably has an inlet capacity which is at least a multiple of the inlet capacity of compressor B. In any event, it is essential that the capacity of the first compressor be substantially greater than the inlet capacity of the second compressor as otherwise portability for high capacity will not be achieved. The compressor A is of the multi-stage axial flow type, and normally is used in gas turbine sets as the supply of combustion air for generating the fluid energy to operate the turbine. This type equipment is also used to super-charge engines by means of exhaust gas energy operating the gas turbine 14.

According to this invention, the compressor A receives air (or other gas) at 15, from a filter 16. The air is then compressed and discharged at 17, passing through an intercooler 18 to inlet 13 of compressor B. Thus, compressor A becomes the first stage of the compressor system, in which compressor B is the second stage.

Since gas turbine 14 does not receive energy from compressor A and a separate combustion chamber as normally is the case, means are provided directly from the exhaust manifold 19 of the engine 10 to supply hot gases to the gas turbine. The means and methods for providing exhaust gas energy are well known to designers of exhaust gas driven turbo-superchargers.

In describing operation of the compressor system, I do so in terms of specific performance based on a requirement of 3600 C. F. M. of air discharging at approximately 100 p. s. i. g. Accordingly, compressor A has an inlet capacity of 3600 C. F. M., and, operating at a pressure ratio of 4 to 1, delivers 900 C. F. M. to inlet 13 of compressor B. The air at discharge 17 would be greater than 900 C. F. M. due to expansion under heat of compression. However, in order to maintain reciprocating compressor B as small as possible, the intercooler 18 is utilized, a customary arrangement in two stage compressor work.

The compressor B handles 900 C. F. M. at an inlet of 4 atmospheres, and compresses at a 2 to 1 ratio so that, after pipe losses and drop in pressure at the intercooler 18, a discharge pressure of 100 p. s. i. g. is still achieved.

To begin operation, the engine 10 is preferably started with compressor B de-clutched at 12, until a point is reached where the hot exhaust gases issuing from manifold 19 have sufficient energy to rotate gas turbine 14 and compressor A at speed sufficient to deliver air under pressure. Then, the compressor B is connected to engine 10 and pressure will gradually increase until the operating point is reached.

To understand the significance of what has been accomplished by this new relationship of admittedly well known industrial components, it is necessary to refer to certain performances.

For two stage compression of air, for example, it is an industry standard that no more than 19 brake horsepower be consumed for every 100 C. F. M. at 100 p. s. i. g. Thus, 3600 C. F. M. at 100 p. s. i. g. requires 684 brake horsepower, a horsepower figure that indicates an engine of such proportions that portability is not possible, especially without a high speed first stage compressor, such as compressor A of the present invention. Exhaust gas turbine super-charging of a normally rated 400 horsepower engine to approximately 700 horsepower is possible, so as to maintain the engine at some reasonable size per weight, but there still remains the problem of providing 3600 C. F. M. of inlet air to the compressor system.

By the present invention, the engine 10 has to be only somewhat larger than the horsepower required to compress 900 C. F. M. at an inlet of 4 atmospheres (58.8 p. s. i. a.) over a 2 to 1 ratio to 117.6 p. s. i. a. (103 p. s. i. g.). This can be achieved for 240 B. H. P. in a single stage, multicylinder piston compressor of 900 C. F. M. inlet capacity. Therefore, it is appropriate to select an engine 10 of approximately 375 to 400 brake horsepower, since throttling of the exhaust gases through gas turbine 14 will to some degree reduce its net available power; excess power of engine 10 is desirable in any event since compressor B may be called upon to compress over a ratio higher than 2 to 1. It should be understood that engine 10 may be two or four cycle, and super-charged mechanically, if desired.

The horsepower required to operate compressor A at a 4 to 1 ratio while handling 3600 C. F. M. of air is 450 brake horsepower. However, the energy for this work is from the exhaust gases of engine 10 at an expenditure of not more than 150 horsepower for exhaust back pressure due to turbine 14. Thus, through this combination, a 375 to 400 horsepower engine compresses 3600 C. F. M. of air at 100 p. s. i. g., for an apparent rate of about 10.5 to 11 brake horsepower per 100 C. F. M. as against the industry standard of 19 brake horsepower per 100 C. F. M.

This seemingly improbable result is due to the fact that the elements, compressor A and gas turbine 14, normally used to super-charge an engine, such as 10, are used to super-charge the low C. F. M. capacity compressor B, and in this fashion a result is achieved not to be expected by simply super-charging the engine 10 and using the higher available horsepower for compression work in normal fashion. As a matter of practical fact, the actual brake horsepower for compressing the volume of air is somewhere near industry standard, but a good share of this is developed by the exhaust gas driven turbine. In order to have sufficient energy in the exhaust gas, the engine exhaust must be throttled with consequent increase of fuel consumption per brake horsepower hour. This is a loss that must be accepted in achieving a high capacity mobile compressor.

However, the over-all result is vastly superior to a mere super-charging of the engine 10. In the first place, the engine 10 could not be super-charged to 4 atmospheres because of its thermal and bearing limitations. Secondly, super-charging the engine does not result in the same order of economies because the over-all thermal efficiency of the engine 10 is much lower than compression efficiency of compressor B.

The engine 10 is, in effect, a partial gas generating unit for gas turbine 14 to drive compressor A, and is also the primary source of rotating power for compressor B. These facts and their importance will be well recognized by engineers in the oil and gas power field. It will also be recognized that while the arrangement of parts is particularly adaptable for portable units, the invention is not necessarily so limited.

I claim:

In a compressor system, the combination of an internal combustion engine having exhaust means, a compressor having an inlet and an outlet driven by said engine and requiring power from said engine less than the normal rating of said engine whereby a surplus of fluid energy is provided for the engine exhaust means, a gas turbine element, a compressor having an inlet and an outlet driven by said gas turbine element, such compressor having its inlet capacity at least twice the inlet capacity of the engine driven compressor and operating over a compression ratio equal at least to the ratio of the inlet volume that the gas turbine driven compressor bears to the engine driven compressor, means connecting said engine exhaust means from said engine to operate said gas turbine element by fluid power, means connecting the outlet of the turbine driven compressor to the inlet of said engine driven compressor including an intercooler for reducing the compressed volume of the turbine driven compressor to the inlet capacity of the engine driven compressor.

References Cited in the file of this patent
UNITED STATES PATENTS

| 132,891 | Bailey | Nov. 12, 1872 |
| 1,140,065 | Rateau | May 18, 1915 |